US009329065B2

(12) United States Patent
Mashak

(10) Patent No.: US 9,329,065 B2
(45) Date of Patent: May 3, 2016

(54) VARIABLE ORIFICE FLOW SENSOR UTILIZING LOCALIZED CONTACT FORCE

(71) Applicant: General Electric Company, Schenectady, NY (US)

(72) Inventor: James N. Mashak, Madison, WI (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 14/341,281

(22) Filed: Jul. 25, 2014

(65) Prior Publication Data

US 2016/0025533 A1    Jan. 28, 2016

(51) Int. Cl.
*G01F 1/42* (2006.01)
(52) U.S. Cl.
CPC .......................................... *G01F 1/42* (2013.01)
(58) Field of Classification Search
CPC ................ G01F 1/42; G01F 1/22; G01F 1/37
USPC ................ 73/861.61, 861.62, 861.52, 861.53
See application file for complete search history.

(56) References Cited

U.S. PATENT DOCUMENTS

| 4,083,245 | A | * | 4/1978 | Osborn ..................... G01F 1/42 73/861.53 |
| 4,989,456 | A | * | 2/1991 | Stupecky ............. A61B 5/0876 138/46 |
| 5,033,312 | A | | 7/1991 | Stupecky |
| 5,038,621 | A | | 8/1991 | Stupecky |
| 5,970,801 | A | * | 10/1999 | Ciobanu .............. A61B 5/0876 73/861.52 |
| 6,722,211 | B1 | * | 4/2004 | Ciobanu .................... G01F 1/42 73/861.52 |
| 7,270,143 | B2 | * | 9/2007 | Kohlmann ............. A61B 5/087 137/312 |
| 7,798,016 | B2 | * | 9/2010 | Bonassa .................... G01F 1/40 73/861.61 |
| 2003/0097880 | A1 | | 5/2003 | Ciobanu et al. |
| 2009/0064794 | A1 | | 3/2009 | Bonassa |

FOREIGN PATENT DOCUMENTS

CH              701755 A1     3/2011

OTHER PUBLICATIONS

International Search Report and Written Opinion for PCT/US2015/038513, mail date Oct. 9, 2015, 10 pages.

* cited by examiner

*Primary Examiner* — Jewel V Thompson
(74) *Attorney, Agent, or Firm* — Boyle Fredrickson, S.C.

(57) ABSTRACT

A variable orifice fluid flow sensor is provided that includes a fluid flow passage therethrough formed with a first port portion adjacent to one end of said passage and a second port portion adjacent to the other end of said passage. A bending member is mounted in the fluid flow passage between the first and second port portions and having a fluid flow limiting flapper extending across the fluid flow passage for creating a fluid flow opening in the passage, the size of the opening being variable responsive to fluid flow in said fluid flow passage. A biasing member is also mounted between the first and second port portions and includes at least one biasing element extending away from the biasing member into contact with the bending member to exert a contact force on the bending member.

13 Claims, 4 Drawing Sheets

VARIABLE ORIFICE FLOW SENSOR UTILIZING LOCALIZED CONTACT FORCE

BACKGROUND OF THE INVENTION

The invention relates generally to flow sensors, and more particularly, to variable orifice fluid flow sensors.

Orifice flow sensors are used to measure the flow rates of fluids, which include liquids and gases. A typical orifice flow sensor comprises a fixed orifice through which a fluid is made to flow. A pressure difference is established between the fluid that is present upstream from the orifice and the fluid that is flowing through the orifice. This pressure difference can be used to measure the flow rate of the fluid. For this purpose, a pressure transducer measures the pressure difference that is established across the orifice, and is calibrated such that the flow rate of the fluid is calculated from this pressure difference.

Variable orifice flow sensors provide sufficient pressure difference for measurement purposes across a broad range of flow rates. This is achieved by introducing a bending member into the fluid flow passage. The bending member is mounted to the housing for the fluid flow passage and includes a flapper that is positioned across the fluid flow passage and bends or flexes in the direction of the fluid flow as a result of contact with the fluid flow, and hence creates a variable orifice within the fluid flow passage. The measurement of flow rates in a variable orifice flow sensor is similar to the measurement of flow rates in fixed orifice flow sensors. That is, a pressure transducer measures the pressure difference across the variable orifice and calculates the flow rate of the fluid from the pressure difference.

U.S. Pat. Nos. 4,989,456; 5,033,312; 5,038,621; 6,722,211 and 7,270,143 show variable orifice flow sensors.

The performance of the sensor can be directly influenced by the connection of the bending member including the flapper to the housing that defines the fluid flow passage. In situations where the bending member is rigidly secured to the housing, this tight engagement with the housing can distort the movement of the flapper to negatively affect its operation. Further, in situations where the bending member is too loosely secured to the housing, it is possible for fluid to flow around the bending member through leaks located between the housing and the bending member.

In either situation, the movement and operation of the flapper is affected by the connection of the bending member to the housing, and hence the measured pressure difference across the variable orifice defined by the flapper becomes altered, such as by poor low flow resolution and non-linear movement of the flapper. This, in turn, leads to inaccurate measurements of the flow rate of the fluid.

BRIEF DESCRIPTION OF THE INVENTION

In the present invention a variable orifice fluid flow sensor is provided having two port portions engaged with one another that form a fluid flow passage through the sensor. A variable orifice device with a bending member including a fluid flow limiting flapper is provided between the two port portions. The variable orifice device also includes a biasing member that is disposed between the two port portions and that engages the bending member around the gas flow passage. The biasing member includes a number of biasing elements that extend outwardly from the biasing member into contact with the bending member. The engagement of the biasing elements with the bending member provides a constant contact and/or biasing force against the bending member to hold the bending member relative to the two port portions in a manner that does not negatively affect the operation of the flapper in determining a fluid flow pressure differential and measuring the corresponding fluid flow rate.

DETAILED DESCRIPTION OF THE INVENTION

Figure 1:
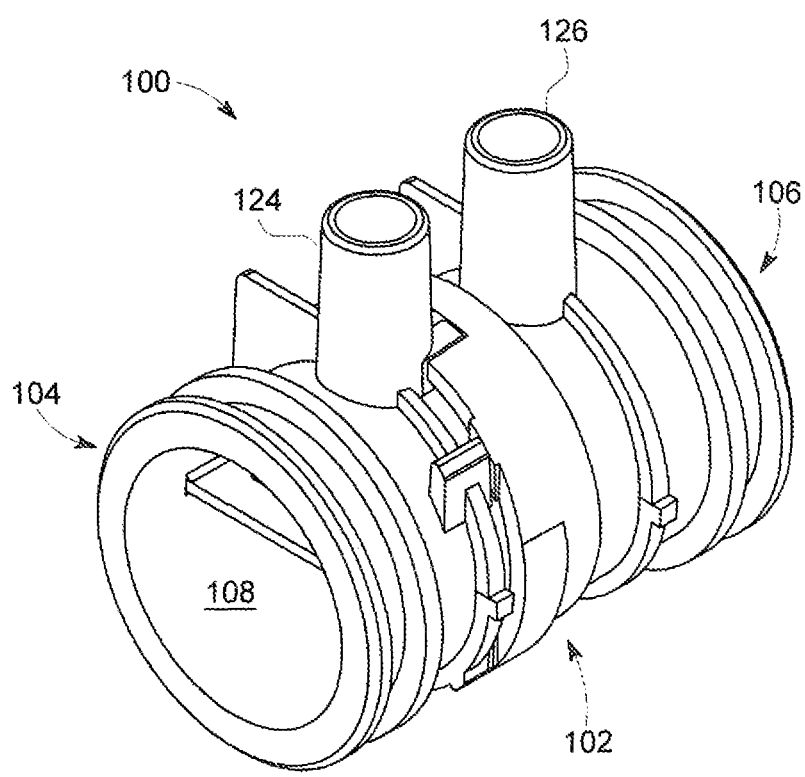
FIG. 1 is an isometric view of a variable orifice fluid flow sensor in accordance with an exemplary embodiment of the invention.

FIG. 1 illustrates an isometric view of a variable orifice fluid flow sensor 100 in accordance with one embodiment of the present invention. Variable orifice fluid flow sensor 100 develops pressure differences that are used to measure flow rates of fluids, such as gases, flowing through the flow sensor 100. Therefore, variable orifice fluid flow sensor 100 can also be referred to as a differential pressure variable orifice gas flow sensor. Variable orifice gas flow sensor 100 has a generally cylindrical configuration. However, variable orifice gas flow sensor 100 may be formed in a variety of shapes and sizes and still lie within the scope of this invention.

Figure 2:
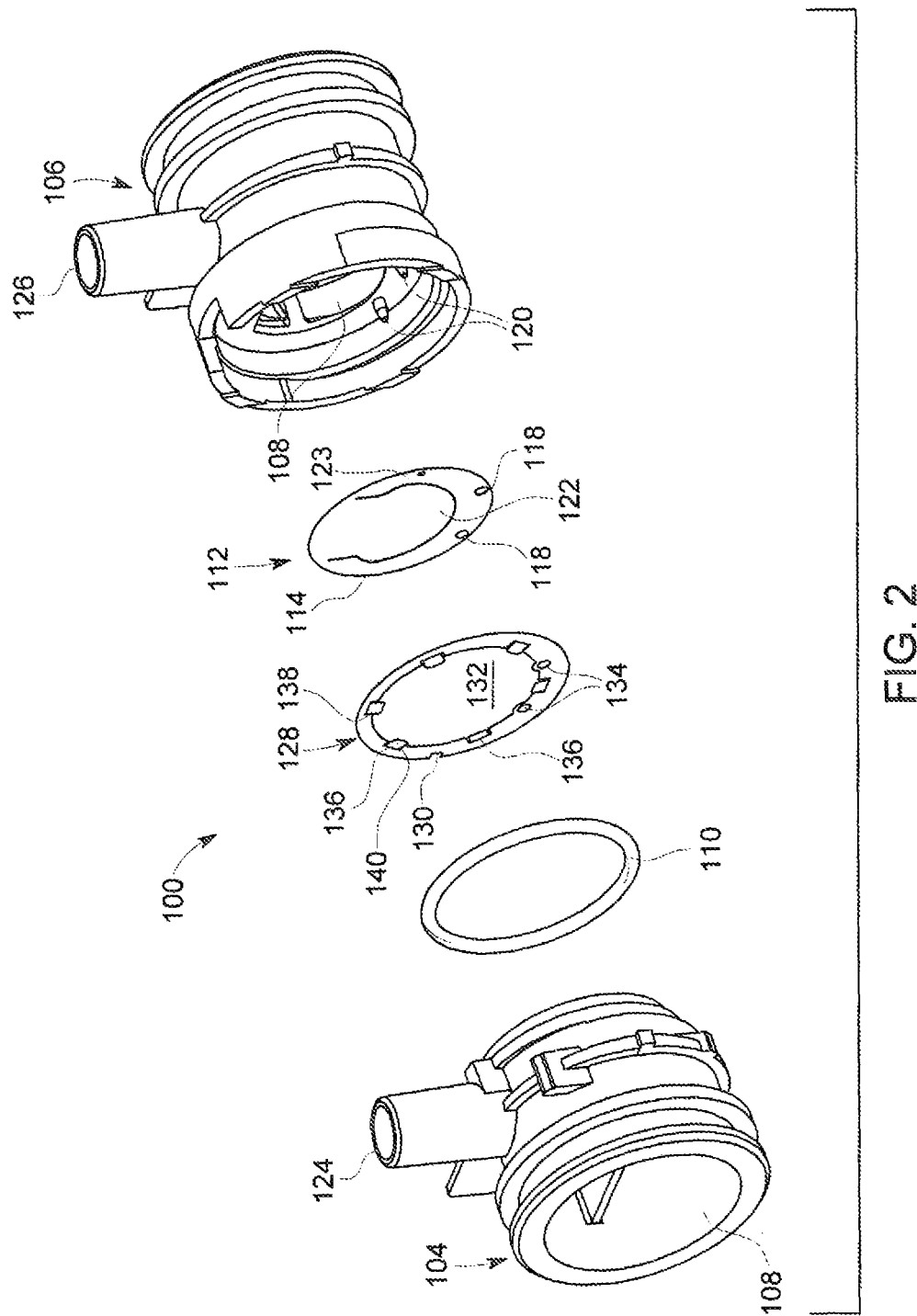
FIG. 2 is an exploded isometric view of a variable orifice fluid flow sensor in accordance with another exemplary embodiment of the invention.
Figure 3:
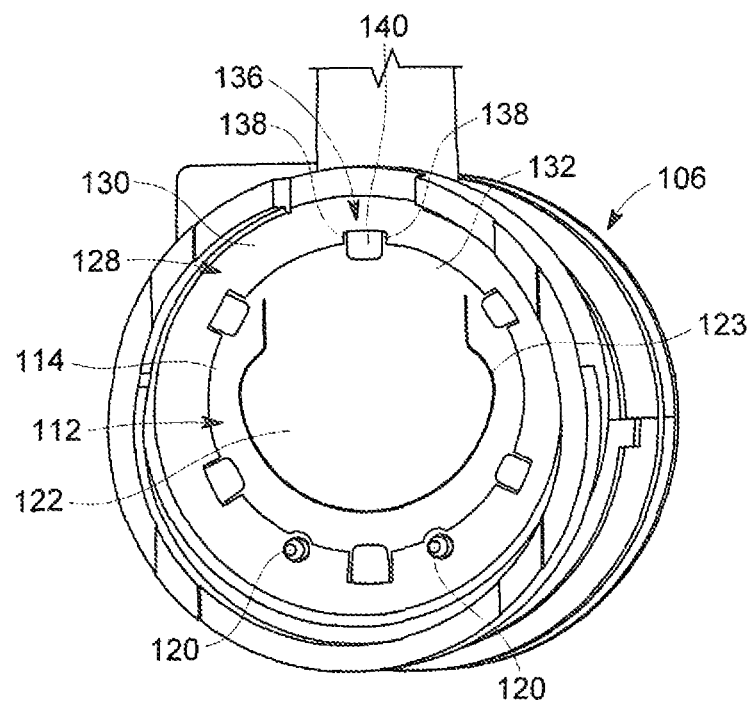
FIG. 3 is an isometric view of a biasing member and a bending member of a variable orifice fluid flow sensor in accordance with an exemplary embodiment of the invention.
Figure 4:
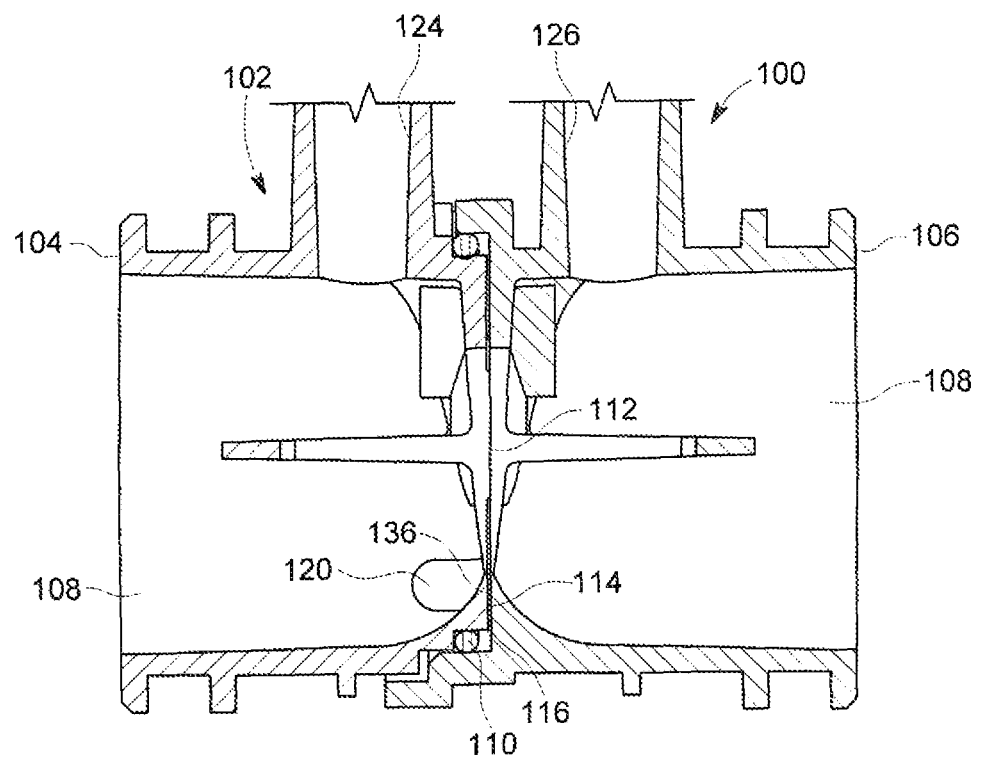
FIG. 4 is a cross sectional view of a variable orifice fluid flow sensor in accordance with yet another exemplary embodiment of the invention.
Figure 5:
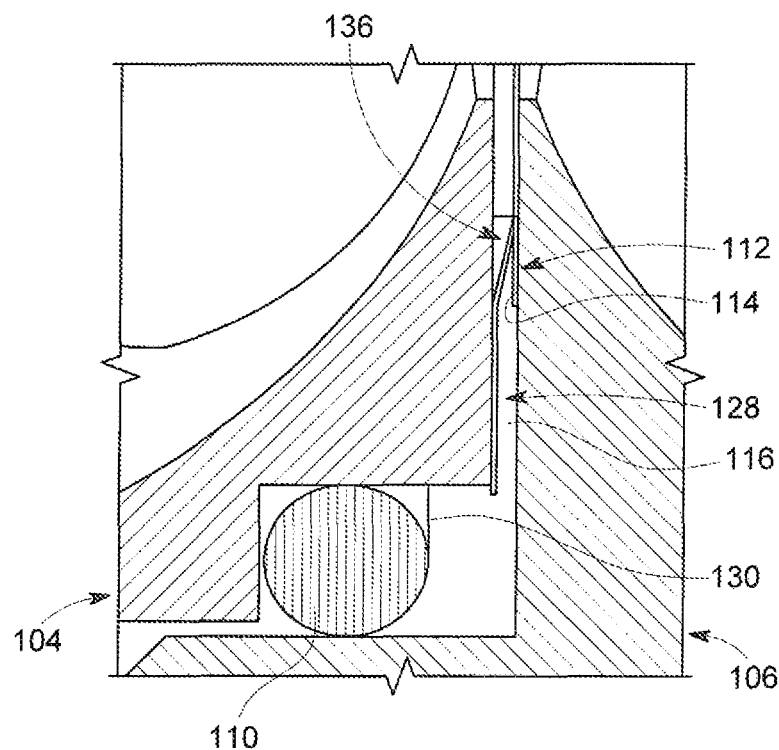
FIG. 5 is a partially broken away cross sectional view of a variable orifice fluid flow sensor in accordance with yet another exemplary embodiment of the invention.

FIGS. 2-4 illustrate variable orifice gas flow sensor 100 comprising a housing 102 that includes a first port portion 104 and a second port portion 106 that are connected to one another to define a gas flow passage 108 therein through which a gas flows. A sealing member 110 is disposed and engaged between the first port portion 104 and the second port portion 106 to prevent gas flowing through the gas flow passage 108 from exiting the passage 108 between the first port portion 104 and second port portion 106. When variable orifice gas flow sensor 100 is used for measuring gas flow rates in a breathing apparatus, a flow sensor 100 is inserted at one or more desired locations in a breathing circuit.

Variable orifice gas flow sensor 100 includes a bending member 112 intermediate to first port portion 104 and second port portion 106. Bending member 112 is generally complementary in shape to the shape of the gas flow passage 108, and includes an outer peripheral member 114 that a diameter larger than the diameter of the gas flow passage 108, such that a portion of the outer peripheral member 114 is disposed within a gap 116 defined between first port portion 104 and second port portion 106 when engaged with one another. The gap 116 can be formed to have the desired with, but hi an exemplary embodiment is formed to be approximately 0.005 inches in width.

To maintain the position of the outer peripheral member 114 and bending member 112 relative to the first port portion 104 and second port portion 106, outer peripheral member 114 includes a number of apertures 118 formed therein that are alignable and positionable on mounting projections 120 formed on first port portion 104 and/or second port portion 106. The mounting projections 120 operate to properly locate the bending member 112 with respect to the first port portion 104 and second port portion 106 an to prevent rotation of the bending member 112 with respect to the first port portion 104 and second port portion 106. Alternatively, in another exemplary embodiment, the apertures 118 and the projections 120 can be omitted entirely or substituted therefor by another suitable structure.

The bending member 112 also includes a fluid or gas flow limiting flapper 122 that is connected at one end to the outer peripheral member 114 and extends inwardly into and across the gas flow passage 108 to separates first port portion 104 and second port portion 106. Because gas flow limiting flapper 122 is attached at one end to the outer peripheral member 114, as gas flows along the gas flow passage 108 through variable orifice gas flow sensor 100, gas flow limiting flapper 122 bends or flexes in the direction of the flow of the gas. For this purpose, gas flow limiting flapper 122, and outer peripheral member 114 when formed integrally with flapper 122, is made from a resilient material. For example, gas flow limiting flapper 122 can be made from resilient plastic or a metal. The bending of gas flow limiting flapper 122 leads to the formation of an increased fluid or gas flow opening 123 in the gas flow passage 108. This gas flow opening 123 defined between the outer peripheral member 114 and the flapper 122 varies with the bending of gas flow limiting flapper 122 due to the flow rate of the gas within the passage 108. A pressure difference is established across gas flow limiting flapper 122. This pressure difference is measured by means of a conventional pressure transducer (not shown in FIGS. 2-4). Gas pressures are provided to the pressure transducer through pressure measurement ports 124 and 126, which open into the gas flow passage upstream and downstream of flapper 122 on first port portion 104 and second port portion 106, respectively. The pressure transducer is calibrated such that the flow rate of the gas through variable orifice gas flow sensor 100 is obtained from the pressure difference across gas flow limiting flapper 122.

FIGS. 2-5 illustrate a biasing member 128 that is positioned between first port portion 104 and second port portion 106 within the gap 116. The biasing member 128 is formed with any suitable shape and of any suitable resilient material, such as a resilient plastic or a metal. In the illustrated exemplary embodiment, the biasing member 128 is formed as ring 130 that defines a central opening 132 therein. The ring 130 is positioned within the gap 116 with the central opening 132 disposed around gas flow passage 108 so as not to obstruct gas flow through the passage 108 or the movement of the flapper 122. The ring 130 also includes a pair of apertures 134 that are formed similarly to apertures 118 in outer peripheral member 114 of bending member 112, though any number of apertures 134 can be utilized, or the apertures 134 can be omitted entirely. The apertures 134 are positioned over the mounting projections 120 to locate the ring 130 properly with respect to the bending member 112 as well as first port portion 104 and second port portion 106, and to prevent rotation of ring 130.

Biasing member 128 also comprises a number of biasing elements 136 disposed on the ring 130 that extend inwardly from the ring 130 into the central opening 132. The biasing elements 136 can extend from the inner edge of the ring 130, or can be separated from the ring 130 by slots 138 disposed on each side of the biasing element 136 that extend into the ring 130. The biasing elements 136 contact the outer peripheral member 114 of the bending member 112 to act on the bending member 112 in a manner that holds the bending member 112 in position between first port portion 104 and second port portion 106 with the desired amount of force to enable proper operation of the flapper 122 on the bending member 112. In the exemplary embodiment in the drawing figures, the biasing elements 136 take the form of tabs 140 that are at least partially bent at an angle with respect to the plane of the ring 130, forming biasing member 128 as a spring washer. The tabs 140 provide localized points of force on the bending member 112, thereby providing a constant biasing force on the outer peripheral member 114 to hold the bending member 112 in the desired position. The size, number and angle of the tabs 140 can be varied from the configuration shown in the exemplary embodiment of the invention showing equidistant tabs 140, along with the material from which the biasing member 128 is formed, to provide the desired amount of force from the tabs 140 on the bending member 112 and enable the flapper 122 to operate correctly, but without distorting the flapper 122 or allowing leaks to form around the bending member 112 in the gas flow passage 108. Further, the use of the biasing member 128 secures the bending member 112 within the gas flow passage 108 with looser assembly tolerances between first port portion 104 and second port portion 106 and without the need for any direct securing of the bending member 112 and/or biasing member 128 to the housing 102, including any additional securing means or members, such as adhesives, fasteners or threaded components on first port portion 104 and second port portion 106. It is also contemplated that the only structure holding the bending member 112 in position in the sensor 100 is the biasing member 128, such that the bending member 112 may float within the gap formed between the first port portion 104 and second port portion 106 under the bias of the biasing member 128.

Figure 6:
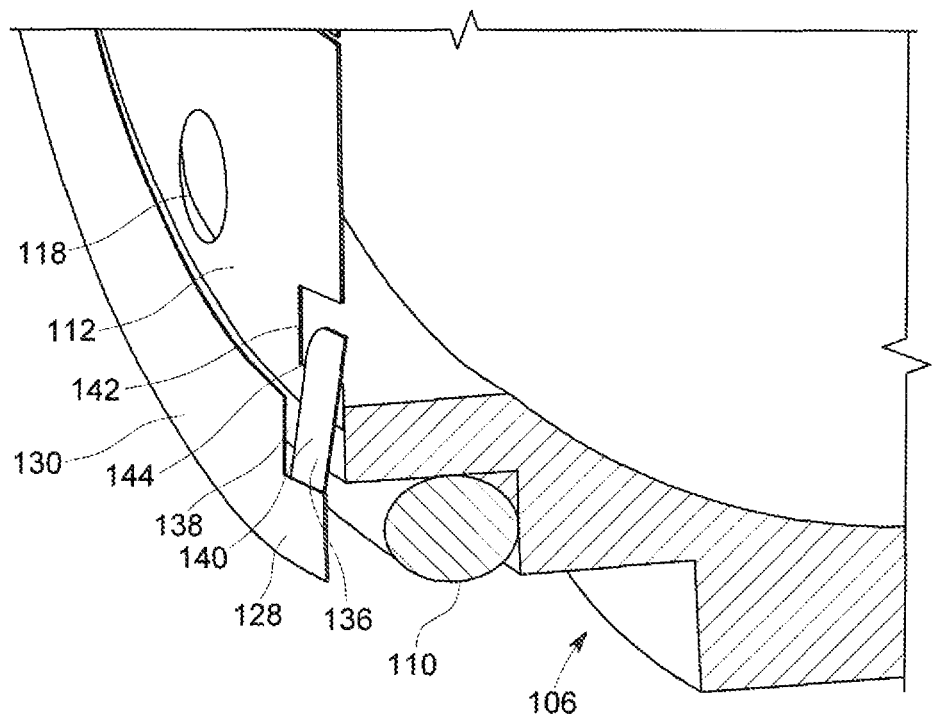
FIG. 6 is a partially broken away cross sectional view of a variable orifice fluid flow sensor in accordance with yet another exemplary embodiment of the invention.

FIG. 6 illustrates another exemplary embodiment of the invention in which the biasing elements 136 contact the outer peripheral member 114 of the bending member 112 within holes 142 formed in the outer peripheral member 112. In this configuration, the tabs 140 apply a force at an angle to the axis of the bending member 112 when the tabs 140 engage an edge or surface 144 of the hole 142 in the bending member 112. This further assists in holding the bending member 112 in position between first port portion 104 and second port portion 106 with the desired amount of force to enable proper operation of the flapper 122 on the bending member 112.

Variable orifice gas flow sensor 100 may be of the single use, disposable type or of the multiple use, reusable type. The former will typically be manufactured from inexpensive plastic material. The latter will usually be manufactured from autoclavable materials, such as metal or high temperature resistant plastic(s).

Variable orifice gas flow sensor 100 may also optionally include one or more fixed orifices (not shown) and a flow-limiting member (not shown). The fixed orifice ensures that gas flows having a velocity that is insufficient to cause bending of gas flow limiting flapper 122 can pass through variable orifice gas flow sensor 100. This can be achieved by shaping gas flow limiting flapper 122 such that there is space for the gas flow to pass through. A flow limiting member restricts the bending of gas flow limiting flapper 122 to provide an appropriate pressure difference across the flapper for high flow rates.

The various embodiments of the invention provide a variable orifice gas flow sensor 100 that is capable of reproducibly measure a broad range of flow rates by attaching the bending member 112 to the housing 102 for the variable orifice fluid flow sensor 100 in a manner that minimizes the effect of the attachment on the operation of the bending member 112.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable orifice fluid flow sensor comprising:
  a) a housing having a fluid flow passage therethrough, said fluid flow passage being formed with a first port portion adjacent to one end of said passage and a second port portion adjacent to the other end of said passage;
  b) a bending member mounted in the fluid flow passage between the first and second port portions and having a fluid flow limiting flapper extending across the fluid flow passage for creating a fluid flow opening in the passage, the size of the opening being variable responsive to fluid flow in said fluid flow passage; and
  c) a biasing member mounted between the first and second port portions, the biasing member including at least one biasing element extending outwardly from the biasing member into contact with the bending member to exert a contact force on the bending member.

2. The flow sensor according to claim 1 wherein the biasing member comprises a ring disposed within a gap formed between the first and second port portions and from which the at least one biasing element extends.

3. The flow sensor according to claim 1 wherein the ring includes at least one aperture positionable on at least one mounting projection disposed on one of the first or second port portions.

4. The flow sensor according to claim 1 wherein the ring defines a central opening in alignment with the fluid flow passage.

5. The flow sensor according to claim 1 wherein the ring does not overlap the flapper.

6. The flow sensor according to claim 1 wherein the at least one biasing element extends outwardly at an angle with respect to the ring into contact with the bending member.

7. The flow sensor according to claim 6 wherein the at least one biasing element extends into contact with an outer peripheral member of the bending member that surrounds the flapper.

8. The flow sensor according to claim 1 wherein the bending member and biasing member are not directly secured to the first or second port portion.

9. The flow sensor according to claim 1 wherein the bending member includes at least one aperture positionable on at least one mounting projection disposed on one of the first or second port portions.

10. The flow sensor according to claim 1 wherein the at least one biasing element is integrally formed with the ring.

11. The flow sensor according to claim 1 further defined as a differential pressure fluid flow sensor and wherein said housing has pressure measurement ports opening into said fluid flow passage.

12. The flow sensor according to claim 1 wherein the bending member includes at least one hole defining an edge that is engaged by the at least one biasing element.

13. A method for determining the flow rate of a fluid flow, the method comprising the steps of:
  a) providing a variable orifice fluid flow sensor comprising:
    i) a housing having, a fluid flow passage therethrough, said fluid flow passage being formed with a first port portion adjacent to one end of said passage and a second port portion adjacent to the other end of said passage;
    ii) a bending member mounted in the fluid flow passage between the first and second port portions and having a fluid flow limiting flapper extending across the fluid flow passage for creating a fluid flow opening in the passage, the size of the opening being variable responsive to fluid flow in said fluid flow passage; and
    iii) a biasing member mounted between the first and second port portions, the biasing member including at least one biasing element extending outwardly from the biasing member into contact with the bending member to exert a contact force on the bending member;
  b) directing a fluid flow through the fluid flow passage; and
  c) determining the flow rate of the fluid flow based on a sensed pressure differential across the variable orifice fluid flow sensor.

* * * * *